(12) United States Patent
Ito

(10) Patent No.: US 7,743,657 B2
(45) Date of Patent: Jun. 29, 2010

(54) ANGULAR VELOCITY SENSOR DEVICE

(75) Inventor: Takeshi Ito, Okazaki (JP)

(73) Assignee: DENSO CORPORATION, Kariya (JP)

( * ) Notice: Subject to any disclaimer, the term of this patent is extended or adjusted under 35 U.S.C. 154(b) by 496 days.

(21) Appl. No.: 11/642,715

(22) Filed: Dec. 21, 2006

(65) Prior Publication Data

US 2007/0175277 A1    Aug. 2, 2007

(30) Foreign Application Priority Data

Feb. 1, 2006    (JP)    ............................. 2006-024286

(51) Int. Cl.
*G01P 15/00*    (2006.01)
(52) U.S. Cl. ............... 73/514.19; 73/504.02; 73/514.02; 73/514.32; 361/280
(58) Field of Classification Search ............... 73/514.19, 73/504.01, 504.02, 504.03, 509, 511, 514.02, 73/514.27, 514.32, 488, 862; 361/280
See application file for complete search history.

(56) References Cited

U.S. PATENT DOCUMENTS

| 5,266,988 | A | | 11/1993 | Washisu | |
|---|---|---|---|---|---|
| 5,701,113 | A | | 12/1997 | Edberg | |
| 5,825,560 | A | | 10/1998 | Ogura et al. | |
| 6,023,974 | A | * | 2/2000 | Hara et al. | ............... 73/504.15 |
| 6,151,966 | A | * | 11/2000 | Sakai et al. | ............... 73/514.32 |
| 6,308,568 | B1 | * | 10/2001 | Moriya | ..................... 73/504.13 |
| 6,629,503 | B2 | | 10/2003 | Post | |
| 6,664,880 | B2 | | 12/2003 | Post | |
| 6,666,091 | B2 | * | 12/2003 | Hatanaka et al. | .......... 73/504.16 |
| 6,683,397 | B2 | * | 1/2004 | Gauthier et al. | ............ 310/68 B |
| 6,891,299 | B2 | * | 5/2005 | Coupart et al. | .......... 310/156.55 |
| 7,134,336 | B2 | * | 11/2006 | Mase et al. | ............... 73/504.12 |
| 7,318,348 | B2 | * | 1/2008 | Ogino | ..................... 73/504.14 |
| 7,523,665 | B2 | * | 4/2009 | Katsumata et al. | ........ 73/514.32 |
| 2003/0029239 | A1 | * | 2/2003 | Hatanaka et al. | .......... 73/504.16 |
| 2005/0204815 | A1 | * | 9/2005 | Mase et al. | ............... 73/504.12 |
| 2005/0274181 | A1 | * | 12/2005 | Kutsuna et al. | ........... 73/504.12 |
| 2007/0062543 | A1 | * | 3/2007 | Bastian et al. | ............... 128/844 |
| 2008/0060437 | A1 | * | 3/2008 | Mase | ...................... 73/504.14 |

FOREIGN PATENT DOCUMENTS

| EP | 0 819 337 B1 | 3/2001 |
|---|---|---|
| EP | 1 596 203 A1 | 11/2005 |
| JP | A-2001-126462 | 5/2001 |

OTHER PUBLICATIONS

Office Action dated Sep. 1, 2009 from the German Patent Office in corresponding patent application No. 10 2007 001 381.9-54 (and English translation).

* cited by examiner

*Primary Examiner*—Hezron Williams
*Assistant Examiner*—Samir M Shah
(74) *Attorney, Agent, or Firm*—Posz Law Group, PLC

(57) ABSTRACT

An angular velocity sensor device includes a structure having an angular velocity detecting element and a vibration body formed thereon. The structure is mounted on the case and the angular velocity detecting element is isolated from external vibrations without the need for rubber and gel vibration dampening materials. Permanent magnets of the same polarity are mounted opposite one another on the structure and the case. The magnetic repulsion is generated between the structure and the case to cause the structure to be housed within the case in a levitated state.

4 Claims, 4 Drawing Sheets though the angular velocity detecting element is in a levitated state separate from the case, a power supply is enabled by the solar cell in a non-contact state. In addition, the case may be provided with a compartment through which light may be emitted and supplied to the solar cell. When a portion of the case is made from a translucent material, outside light can be supplied to the solar cell through the translucent portion.
ANGULAR VELOCITY SENSOR DEVICE

CROSS REFERENCE TO RELATED APPLICATION

This application is based on and incorporates herein by reference Japanese Patent Application No. 2006-24286 filed on Feb. 1, 2006.

BACKGROUND OF THE INVENTION

1. Field of the Invention

The present invention relates generally to sensors, and more particularly to an angular velocity sensor including a case that houses an angular velocity detecting element including a vibration body.

2. Description of Related Art

Conventionally, an angular velocity sensor device such as, for example, that disclosed in JP-A-2001-126462 includes a case having a structure that houses an angular velocity detecting element having a vibration body formed thereon. The vibration body of such an angular velocity sensor device is driven to oscillate, and an angular velocity can be detected based on displacement of the vibration body by the Coriolis effect.

In addition, when such a sensor device is mounted to an automobile, sensor accuracy is adversely affected when external vibrations such as vehicle vibrations are transmitted from the case to the angular velocity detecting element.

To protect against these external vibrations, rubber materials and gel materials are used to support the structure within the case and effectively act as vibration dampeners.

However, because the rubber materials and gel materials deteriorate over time, the output characteristic of the angular velocity detecting element may be adversely affected.

SUMMARY OF THE INVENTION

According to an exemplary embodiment of the present invention, an angular velocity sensor device includes a case having a structure that houses an angular velocity detecting element including a vibration body formed thereon without the need for rubber and gel dampening materials. Such an angular velocity sensor device also includes magnets located between the structure and the case in the angular velocity sensor device so that the structure is maintained in a levitated state relative to the case while being housed in the case. Accordingly, the structure including the angular velocity detecting element is housed within, but does not contact, the case. Thus, the angular velocity detecting element is isolated from external vibrations without the need for rubber and gel vibration dampening materials.

More specifically, a pair of permanent magnets of like polarity are respectively mounted on the structure and the case opposite each other to realize the resulting magnetic force generated between the magnets.

In addition, an electromagnet may be provided between the case and the structure, and mounted on the case opposite the structure. It may generate a magnetic force to attract the case to the structure and cause the structure to be maintained in a levitated state relative to the case due to the balance of the magnetic repulsion force of the like polarity magnets and the attraction force of the electromagnet.

In addition, a static electricity generator may be provided between the case and the housing for generating static electricity that causes the structure to become attracted to the case. The structure is maintained in a levitated state relative to the case by maintaining a balance between the magnetic force of the same polarity magnets and the static electricity gravitation generated by the static electricity generator in a manner similar to above-mentioned electromagnet.

More specifically regarding the magnets of the same polarity, the magnetic repulsion acts in plural directions, for example from the top and bottom in a gravity direction, such as a z-axis direction, and on opposing sides in a horizontal direction, such as an x-axis direction, of the structure. As thus described the attraction of the magnet acts on the structure from the top and bottom directions and the right and left directions so that the levitated state of the structure may be realized in a stable manner.

In addition, the structure includes a package and an angular velocity detecting element electrically connected to the package. The package is electrically connected to the case through a flexible printed wiring board. The flexible printed wiring board is electrically connected to external components. The structure is maintained in a levitated state by the attraction of magnets mounted on the case. Because the printed wiring board is flexible, external vibrations are suppressed.

In addition, a non-contact transmitter for electrically connecting the structure and the case may be provided between the structure and the case instead of the flexible printed wiring board. The non-contact transmitter performs signal transmission between the structure and the case by light transmission or by an electric wave. Electrical signals are adequately transmitted from the structure to external components by the non-contact transmitter.

The non-contact transmitter may include a light emitting element and a light receiving element for receiving the light emitting element. One of the light emitting element and the light receiving element is attached to the structure, while the other is attached to the case, in an opposing manner. Therefore, the signal of the angular velocity detecting element can be externally transmitted by light transmission between the light emitting element and the light receiving element.

In addition, the structure may include a solar cell that transforms light into electricity. Al These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation.

DETAILED DESCRIPTION OF THE PREFERRED EMBODIMENT

Figure 1:
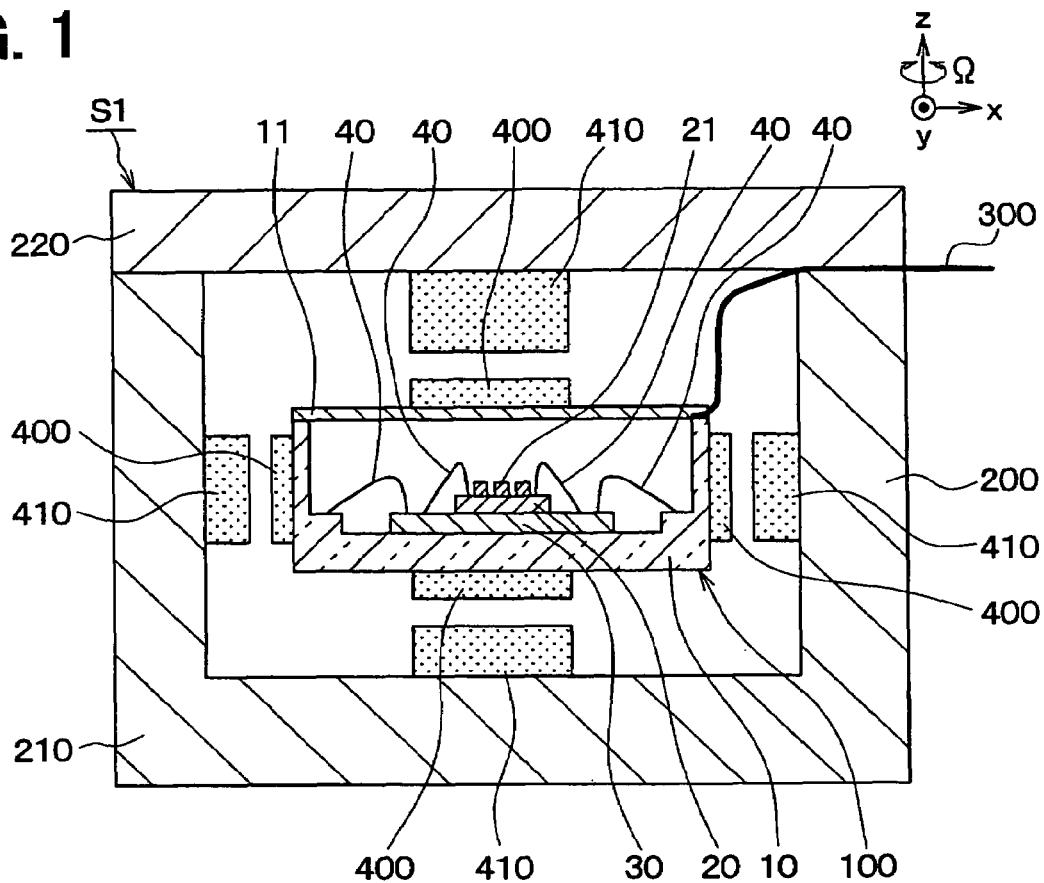
FIG. 1 is a schematic cross-sectional view of an angular velocity sensor device in a first exemplary embodiment.

Exemplary embodiments of an angular velocity sensor device will be described with reference to the appended claims and drawings, all of which form part of this application. In the drawings, identical portions or corresponding portions are identified with the same numerals to eliminate redundant explanation.

Figure 2:
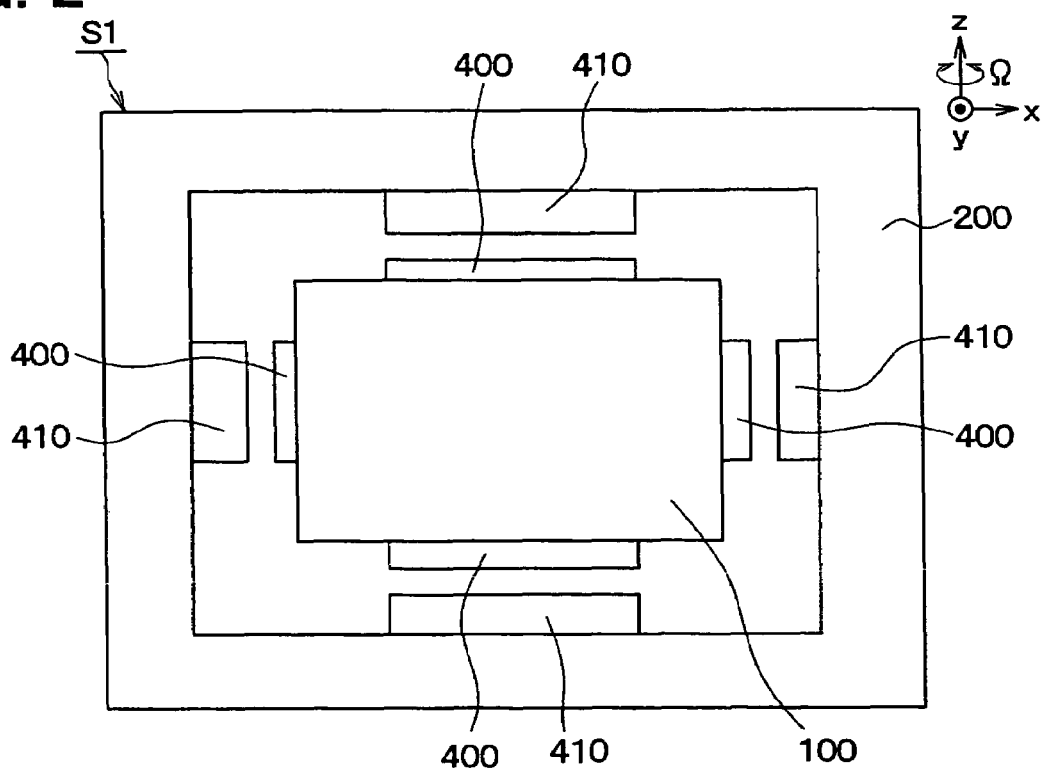
FIG. 2 is a schematic plan view in a case in the angular velocity sensor device shown in FIG. 1.

FIG. 1 is a schematic cross-sectional view of a vibration type angular velocity sensor device S1 in a first exemplary embodiment. FIG. 2 is a schematic plan view of a case 200 in the angular velocity sensor device S1 as shown in FIG. 1. A flexible printed wiring board 300, which is shown in FIG. 1, is omitted in FIG. 2.

The angular velocity sensor device S1 is mounted on an automotive vehicle and can be utilized to detect an angular velocity applied to the automotive vehicle.

As shown in FIG. 1, the angular velocity sensor device S1 includes a case 200, a structure 100 having an angular velocity detecting element 20 formed from a vibration body 21 in the case 200.

The structure 100 is a gyro unit. Circuit board 30 and the angular velocity detecting element 20 are mounted on the package 10 through adhesive material (not shown). Electric connections of the each part are performed with bonding wire such as that shown at 40.

The angular velocity detecting element 20 and the circuit board 30 are mounted to the package 10. The package 10 is a basic part of the structure 100 and is made of a laminated substrate including a plurality of laminated ceramic layers such as alumina layers. Although not shown, wiring in the package 10 is formed within recesses formed in the surface of each ceramic layer.

In addition, a cover 11 made of a material such as metal, resin or ceramic is attached to an aperture of the package 10 by welding or soldering. The inside of the package 10 is therefore sealed. The circuit board 30 is mounted on a bottom of the package 10 and the angular velocity detecting element 20 is adhesively mounted on the circuit board 30.

The angular velocity detecting element 20 detects angular velocity and is a semiconductor chip that includes a well known type of vibration body 21 formed thereon. The angular velocity detecting element 20 is formed from a semiconductor substrate such as a silicon-on-insulator (SOI) substrate by a conventional micro machine or semiconductor process.

The vibration body 21 of the angular velocity detecting element 20 is a comb-shaped beam structure. It is supported by an elastic beam and is movable in response to the application of angular velocity.

When the vibration body 21 is driven, it oscillates in an x-axis direction and an angular velocity ,, is applied around a z-axis, the vibration body 21 moves in a y-axis direction that is perpendicular to the x-axis direction as a result of the Coriolis effect. As a result, angular velocity can be detected.

The angular velocity detecting element 20 includes a detecting electrode (not shown). The detection of angular velocity ,, is enabled through detection of a capacitance change between the detecting electrode and a movable electrode on the vibration body as the vibration body 21 oscillates.

In addition, the circuit board 30 sends a signal for driving the vibration body 21 to enable the angular velocity detecting element 20 to detect vibration body oscillation. The circuit board 30 has a signal-processing chip (not shown) which processes electrical signals from the angular velocity detecting element 20 and externally outputs the processed signals.

The circuit board 30 is provided with IC chips such as, for example, a MOS transistor or a bipolar transistor manufactured by a conventional semiconductor process on the silicon substrate.

As shown in FIG. 1, the bonding wire 40 is electrically connected by gold or aluminum between the angular velocity detecting element 20 and the circuit board 30, and between the circuit board 30 and the package 10. The bonding wire 40 electrically connects each part of the angular velocity detecting element 20, the circuit board 30 and the package 10.

As shown in FIG. 1, the structure 100 is housed in the case 200 made of a material such as ceramic or resin. The case 200 is attached in an appropriate location of an automobile in order to measure angular velocity. The case is provided with a body portion 210 and a cover portion 220. The body portion 210 houses the structure 100 and a cover portion 220 covers an opened portion of the body portion 210.

In addition, the package 10, which is electrically connected to the angular velocity detecting element 20, is also electrically connected to a flexible printed wiring board 300. The flexible printed wiring board 300 is formed from a base material such as polyimide resin and has a copper wiring pattern as is well known.

The flexible printed wiring board 300 is connected to the wiring of the structure 100 by solder. The flexible printed wiring board 300 is disposed through a hole of the case 200, and though a gap between the cover portion 220 and the body portion 210 of the case 200 so that the flexible printed wiring board 300 can be externally electrically connected.

As a result, the angular velocity detecting element 20 is externally electrically connected. More specifically, electrical signals from the angular velocity detecting element 20 are transmitted to the circuit board 30 and are converted to voltage signals by C/V converter circuits formed in the circuit board 30, and the voltage signal as an angular velocity signal is externally transmitted through the flexible printed wiring board 300.

The structure 100 is housed in the case 200 in a levitated state as a result of magnetic repulsion between the structure 100 and the case 200. As shown in FIG. 1 and FIG. 2, two pairs of permanent magnets 400, 410 of the same polarity are respectively mounted opposite one another in an x-axis direction by adhesive material on the structure 100 and the case 200.

The permanent magnets 400 mounted on the structure 100 and the permanent magnets 410 mounted on the case 200 are of the same magnetic polarity, such as N pole or P pole polarity, so that magnetic repulsion forces are generated between the structure 100 and the case 200.

Two pairs of the permanent magnets 400, 410 having the same magnetic polarity are also mounted opposite one another on the structure 100 and the case 200 in a gravity, or z-axis, direction, while two other pairs of the permanent magnets 400, 410 having the same magnetic polarity are also mounted opposite one another on the structure 100 and the case 200 in a y-axis direction (FIG. 2). Alternatively, only one pair of the permanent magnets 400, 410 opposing each other in each of the x, y and z axis directions may be used. In such a case, the structure 100 floats in the case 200 by the balance of forces between the magnetic repulsion and gravity. As shown in FIG. 1 and FIG. 2, when the permanent magnets 400, 410 are mounted on the structure 100 as described above, the levitated state of the structure 100 can be stabilized. Therefore, extra movement of the structure 100 in the space of the case 200 is minimized.

In addition, the number of pairs of permanent magnets may be larger than the number of that as shown in FIG. 1 and FIG. 2. For example, permanent magnets having the same polarity may be mounted along the entire outside of the structure 100 and of the inside of the case 200 so that magnetic repulsion is triggered in a manner similar to that described above.

As thus described, the structure 100 including the angular velocity detecting element 20 is housed and floats in the case 200 in a non-contact, or levitated, state due to magnetic repulsion between the case 200 and the structure 100.

Therefore the angular velocity detecting element 20 is isolated from external vibrations that would otherwise be input though the case 200 to the structure 100 without the use of rubber and gel materials.

Figure 3:
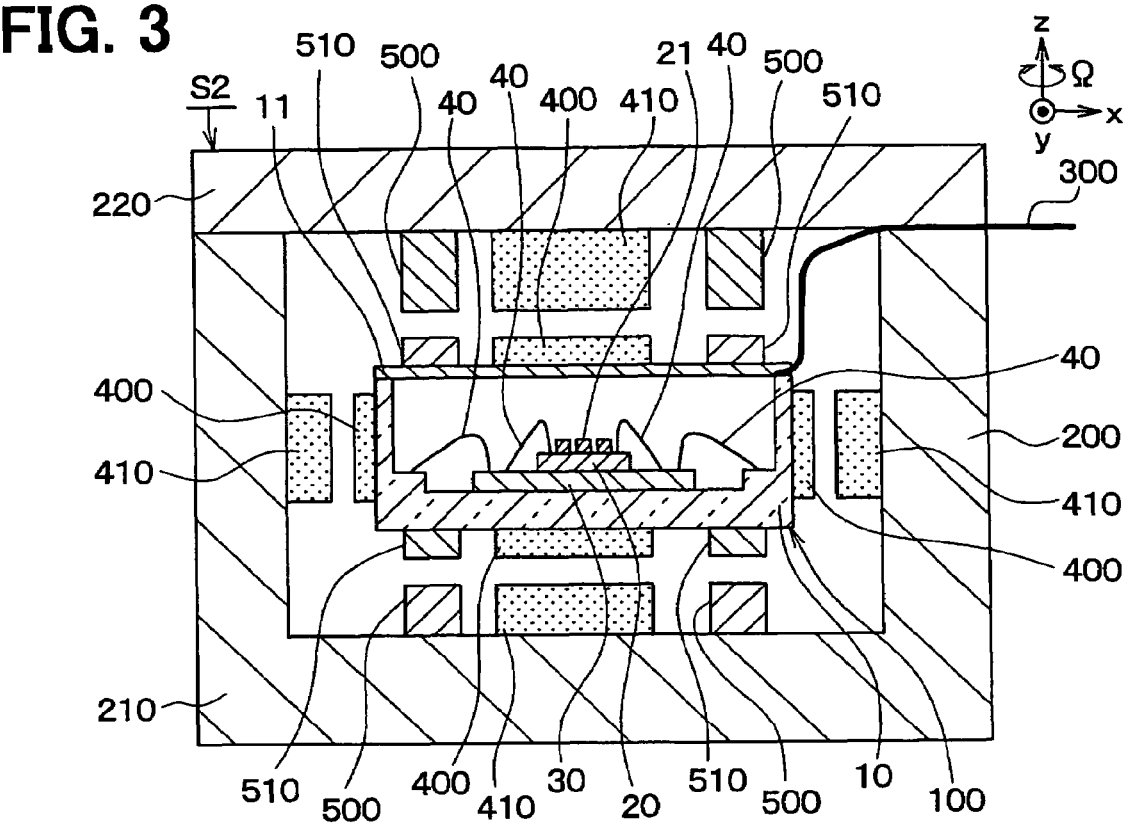
FIG. 3 is a schematic cross-sectional view of an angular velocity sensor device in a second embodiment.

FIG. 3 is a schematic cross-sectional view of an angular velocity sensor device S2 in a second exemplary embodiment. As shown in FIG. 3, an angular velocity sensor device S2 is similar in structure to the device S1, but in addition is provided with an electromagnet 500 and a magnetic body 510 added to the angular velocity sensor device S2 as shown in the first exemplary embodiment. The electromagnet 500 and the magnetic body 510 may be of a conventional type.

The electromagnet 500 is attached to the inside of the case 200 by adhesion and is turned on by electricity supplied through wiring (not shown) installed in the case 200 to generate magnetic attraction. The magnetic body 510 is mounted to the outside of the structure 100 by adhesion. At the time of operation of the electromagnet 500, the magnetic body 510 and the electromagnet 500 are pulled toward each other by generated magnetic attraction.

The electromagnet 500 is provided in the case 200 at a position opposed to the structure 100 and generates magnetic attraction to the structure 100. Therefore, the levitated structure 100 can keep balance between the magnetic repulsion of the permanent magnets 400, 410 and the magnetic attraction of the electromagnet 500.

The balance between magnetic repulsion and magnetic attraction is adjustable based on the amount of power supplied to the electromagnet 500. The adjustment may perfect initially before using the angular velocity sensor device S2, or it may perfect during the actuation of the angular velocity sensor device S2.

When the electricity adjustment of the electromagnet 500 is perfected during the actuation of the angular velocity sensor device S2, an acceleration sensor (not shown) housed in the package 10 inside of the structure 100 detects angle of the structure 100. A detected signal of the obliquity is transmitted to an external adjustment circuit through the flexible printed wiring board 300. The adjustment circuit adjusts the amount of power supplied to the electromagnet 500 corresponding to the detected signal.

In addition, the number of pairs of the electromagnet 500 and the magnetic body 510 and the mounted positions thereof are not limited to the embodiment as shown in FIG. 3, as the number and the mounted positions may be varied.

Figure 4:
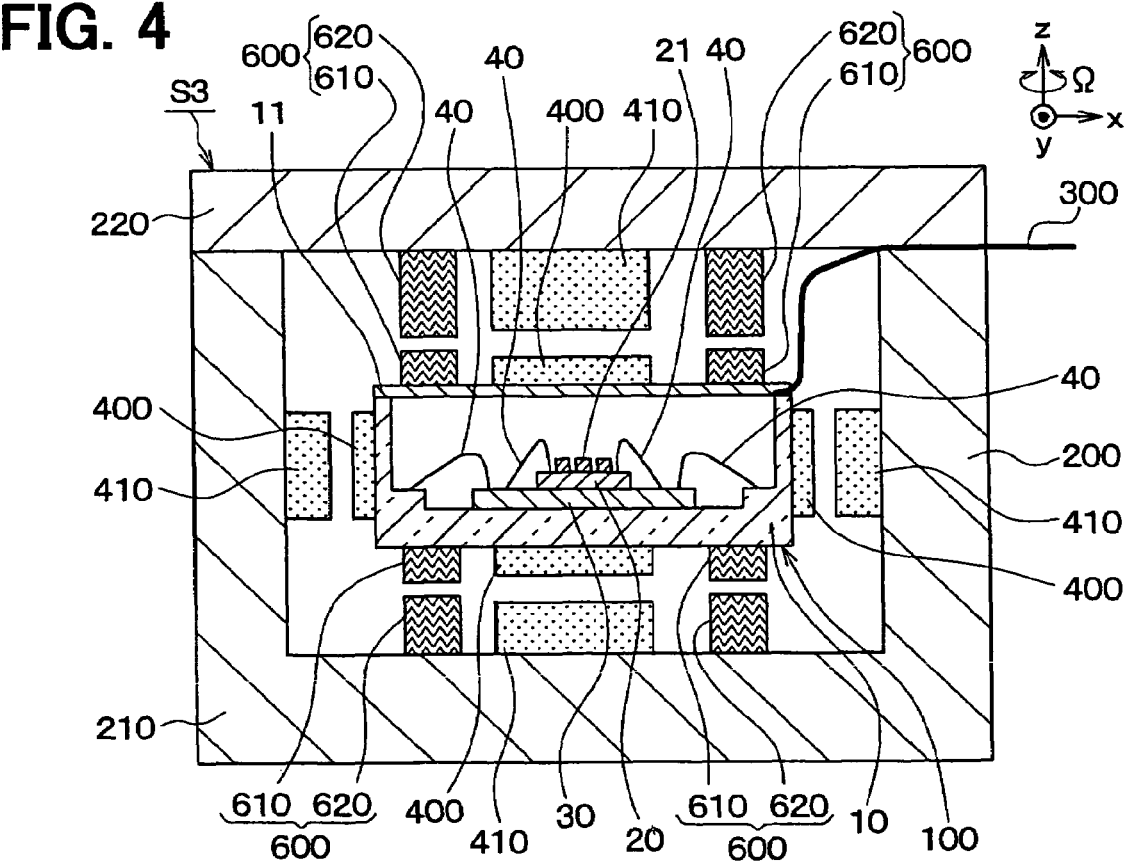
FIG. 4 is a schematic cross-sectional view of an angular velocity sensor device in a third embodiment.

FIG. 4 is a schematic cross-sectional view of an angular velocity sensor device S3 of vibration type in a third exemplary embodiment.

As shown in FIG. 4, the angular velocity sensor device S3 is similar in structure to the device S1, but in addition is provided with a static electricity generator for generating an electrostatic force that causes the causes the structure to be attracted to the case 200.

The static electricity generator 600 includes a structure side electrode 610 and a case side electrode 620. The structure side electrode 610 is mounted on the outside of the structure 100 and the case side electrode 620 is mounted on the inside of the case 200 opposite the structure side electrode 610.

An electric field is generated at the case side electrode 620 through wiring (not shown) mounted on the case 200 so that the electrostatic attraction is generated between the electrodes 610, 620. Specifically, one of the pair of electrodes 610, 620 is connected to GND and the other electrode is connected to plus or minus, thereby generating the electrostatic attraction.

In addition, it is desirable that the distance between the pair of electrodes 610, 620 is less than that between the opposed permanent magnets 400, 410 so that the electrostatic attraction is generated appropriately.

The magnetic repulsion of the permanent magnets 400, 410 and the electrostatic attraction of the static electricity generator 600 can maintain the balance of the levitated structure 100. Further, the timing of the adjusting balance may be before or during the actuation as with the adjustment of the electromagnet 500.

It should be appreciated that the number of the static electricity generators 600 and the mounted position thereof are not limited to those shown in FIG. 4, as the number and the positions may be varied.

In each of the above described first, second and third exemplary embodiments, the sensed angular velocity signal is externally transmitted via the flexible printed wiring board 300 connected between the structure 100 and the case 200. The levitated structure 100 does not receive minute external vibrations so that detection sensitivity is improves. It is easy to connect electrically by using the flexible printed wiring board and to suppress the external vibrations.

In the fourth exemplary embodiment, the electrical connection between the structure 100 and the case 200 is realized in a manner that is the same as that used in the above-mentioned exemplary embodiments to suppresses external vibrations. Namely, the electrical connection between the structure 100 and the case 200 is made in a non-contact manner, and the angular velocity detecting element 20 externally transmits detected signals.

Figure 5:
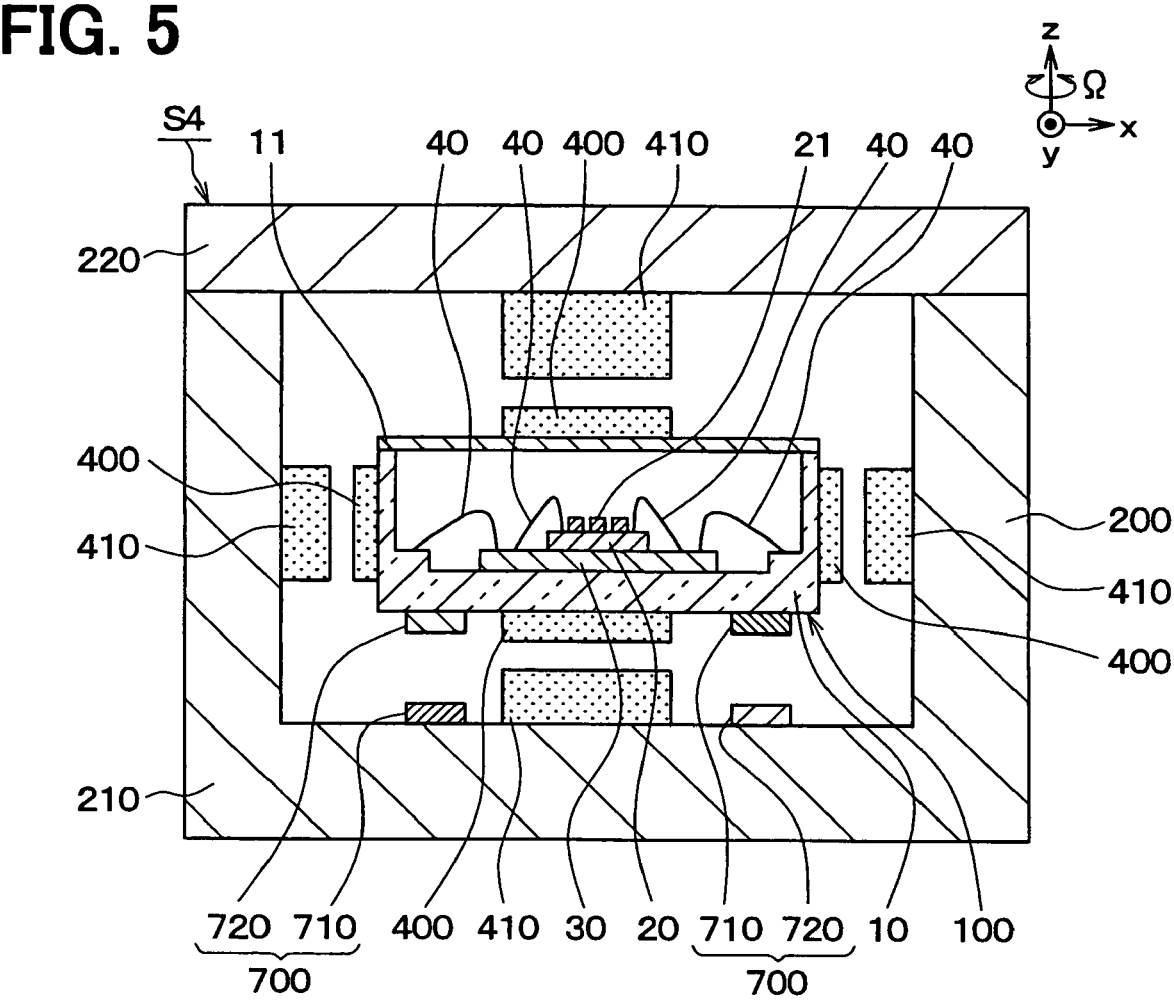
FIG. 5 is a schematic cross-sectional view of an angular velocity sensor device in a fourth embodiment.

FIG. 5 is a schematic cross-sectional view of an angular velocity sensor device S4 in the fourth exemplary embodiment. As shown in FIG. 5, an angular velocity sensor device S4 includes a non-contact wiring device 700 between the structure 100 and the case 200 to externally transfer detection signals from the angular velocity detecting element 20 by light transmission. More specifically, the non-contact wiring device 700 includes a light emitting element 710 and a light receiving element 720. The light receiving element 720 receives light from the light emitting element 710. The light emitting element 710 is mounted on one either the structure 100 or the case 200, and the light receiving element 720 is mounted on the other.

The light emitting element 710 and the light receiving element 720 can use conventional elements such as a laser diode, a photodiode and a light emitting diode (LED).

As shown on the left hand side in FIG. 5, the non-contact wiring device 700 includes the light receiving element 720 mounted on the structure 100 and the light emitting element 710 mounted on the case 200. As shown on the right side in the FIG. 5, non-contact wiring device 700 provides the light receiving element 720 mounted on the case 200 and the light emitting element 710 mounted on the structure 100.

The light emitting element 710 and the light receiving element 720 are electrically connected to the circuit board 30 in the structure 100, the case 200 or an external circuit (not shown) of the case 200. The circuit board 30 and the external circuit convert electrical signals, and the signals are transferred to the light elements 710, 720. As the light elements 710, 720 perform a light transmitting function, a signal of the angular velocity detecting element 20 is externally transferred.

In addition, the number of the non-contact wiring devices 700 and mounted positions thereof are not limited to the embodiment as shown in FIG. 5, as the number and the position of the devices may be changed.

In addition, it will be appreciated that the non-contact wiring device 700 is a useful alternative to the flexible printed wiring board 300 in each embodiment.

Further, alternatively a non-contact wiring device may be used with the light emitting element and the light receiving element to communicate acceleration signals via radio communication.

Figure 6:
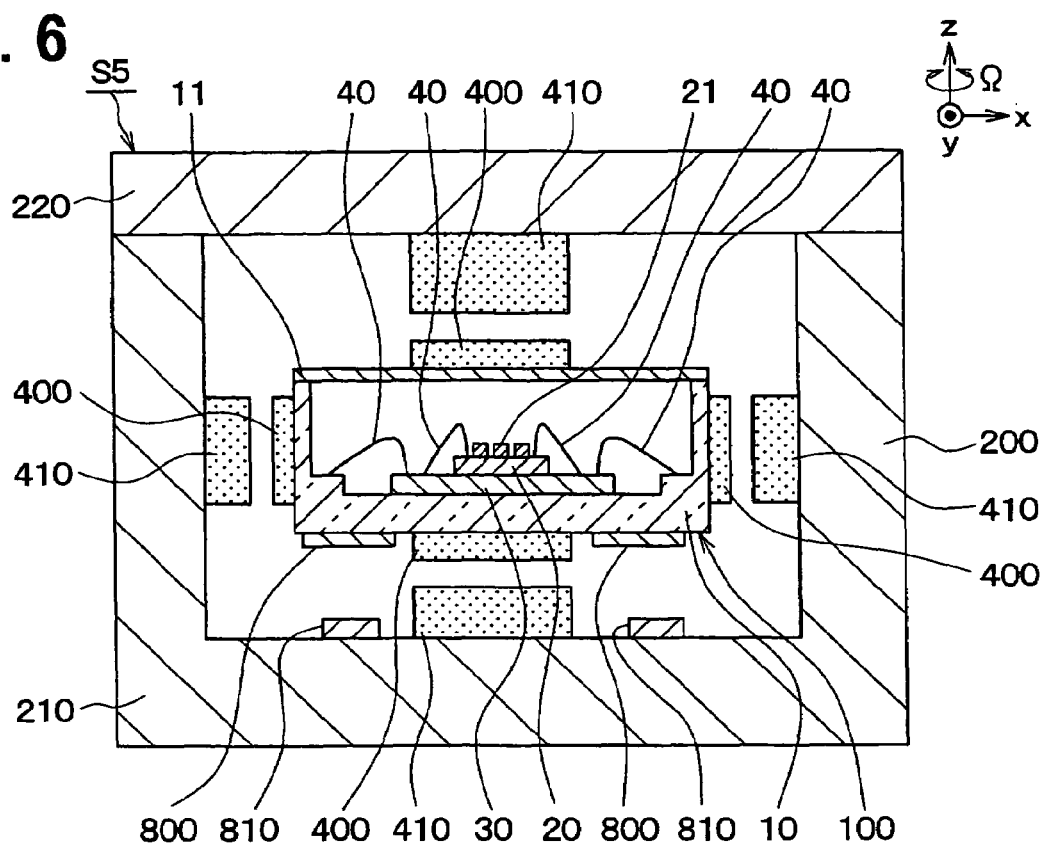
FIG. 6 is a schematic cross-sectional view of an angular velocity sensor device in a fifth embodiment.

FIG. 6 is a schematic cross-sectional view of an angular velocity sensor device S5 in a fifth exemplary embodiment. As shown in FIG. 6, the angular velocity sensor device S5 is provided with a solar cell 800 for converting light to electricity on the structure 100.

Although not shown in FIG. 6, electric wiring between the structure 100 and the outside may be the flexible printed wiring board of the first exemplary embodiment or may be the non-contact wiring as shown to in the fourth exemplary embodiment.

The solar cell 800 is a solar battery as is well known. The solar battery is made of silicon or semiconductor material such as gallium arsenide and absorbs light and converts the light into an electric carrier to generate electric energy.

The solar cell 800 is mounted on the outside of the structure 100 by adhesion and is electrically connected to the wiring of the structure 100. The solar cell 800 supplies power to the angular velocity detecting element 20 and the circuit board 30. Light emission part 810 is mounted on the case 200 and supplies light to the solar cell 800. The light emission part 810 may be the light emitting element as described in the fourth exemplary embodiment, which operates as described above.

In addition, the number of solar cells 800 and light emission parts 810, and mounted positions thereof, are not limited to the embodiment as shown in FIG. 6, as the number and the positions may be changed.

In addition, the present exemplary embodiment is applicable to each of the above-mentioned exemplary embodiments.

Figure 7:
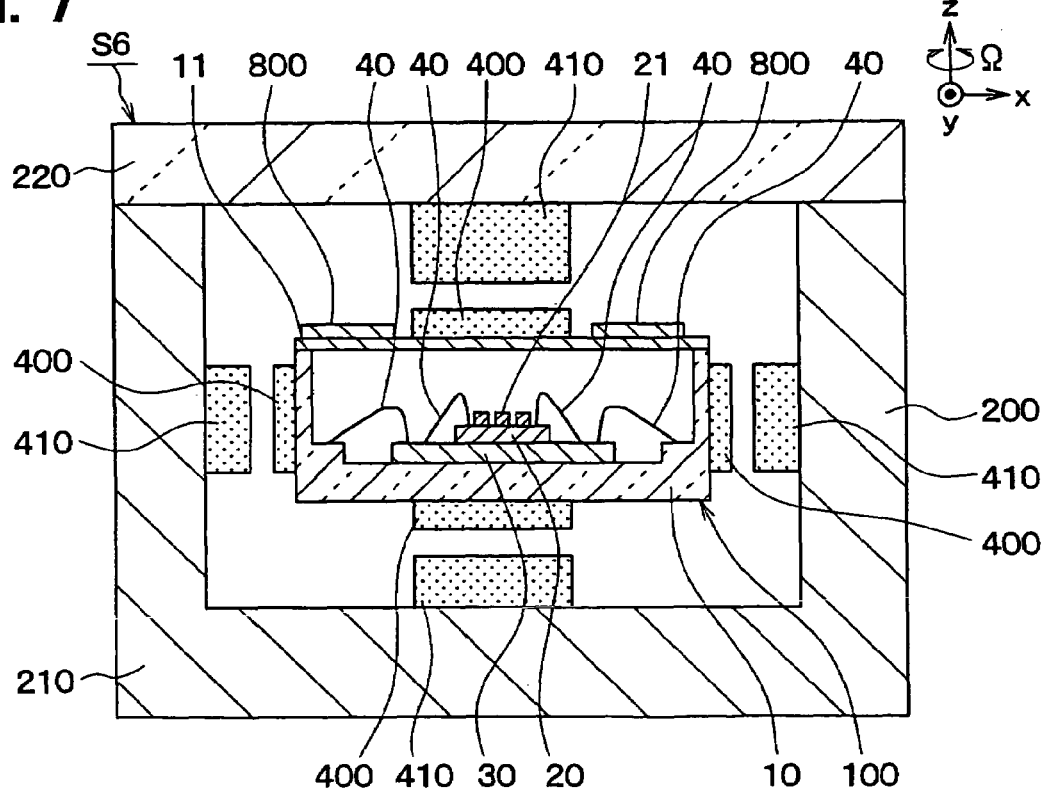
FIG. 7 is a schematic cross-sectional view of an angular velocity sensor device in a sixth embodiment.

FIG. 7 is a schematic cross-sectional view of an angular velocity sensor device S6 in a sixth exemplary embodiment. The light emission part for supplying light to the solar cell 800 in the fifth exemplary embodiment is changed in the angular velocity sensor device S6. In addition, in FIG. 7, the electric wiring between the structure 100 and the outside is omitted as in FIG. 6. The flexible printed wiring board and the non-contact wiring can be used in this embodiment.

As shown in FIG. 7, a cover part 220 in the case 200 is made of translucent material such as glass or transparent resin. External light is supplied to the solar cell 800 through the cover part 220. Therefore, the light supply to the solar cell 800 can be realized without using the light emission part as mentioned in the fifth exemplary embodiment.

Alternatively, the entire case 200 may be made of translucent material.

Also, the present embodiment is applicable to each of the above described first through fourth embodiments.

In addition, although the direction of drive vibration and the direction of detection in the angular velocity detecting element 20 are shown as being oriented along the x-axis and the y-axis as shown in FIG. 1, the angular velocity detecting element 20 may detect the angular velocity by using the Coriolis effect of the vibration body 21 along other defined axes.

In addition, the package 10 is not limited to a ceramic package. The shape of the package 10 and electric connection between each part of the package are not limited to those described above.

In addition, the structure 100 may include the angular velocity detecting element 20 having the vibration body 21. For example, the angular velocity detecting element 20 may be mounted directly on the top of the package 10 without the circuit board 30.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An angular velocity sensor device comprising:
    a case;
    a structure housed within the case and including an angular velocity detecting element with a vibration body mounted thereon;
    means for generating magnetic repulsion between the case and the structure so that the structure is maintained within the case in a levitated state, thereby isolating the structure from external vibrations, and
    static electricity generating means mounted on the case for generating electrostatic attraction between the structure and the case.

2. An angular velocity sensor device comprising:
    a case;
    a structure housed within the case and including an angular velocity detecting element with a vibration body mounted thereon;
    means for generating magnetic repulsion between the case and the structure so that the structure is maintained within the case in a levitated state, thereby isolating the structure from external vibrations, wherein
    a solar cell for converting light to electricity is mounted on the structure.

3. An angular velocity sensor device according to claim 2, wherein a light emitting part for emitting light to the solar cell is mounted on the case.

4. An angular velocity sensor device according to claim 2, wherein the case is partially formed from a translucent material for supplying outside light to the solar cell.

* * * * *